3,152,935
FLARE COMPOSITION
Edgar A. Cadwallader, Rockville, Md., assignor to the United States of America as represented by the Secretary of the Navy
No Drawing. Filed Feb. 17, 1956, Ser. No. 566,317
5 Claims. (Cl. 149—19)
(Granted under Title 35, U.S. Code (1952), sec. 266)

The invention described herein may be manufactured and used by or for the Government of the United States of America for governmental purposes without the payment of any royalties thereon or therefor.

This invention relates to a new and useful composition of matter, the ingredients of which may be caused to react with one another to give illumination. More particularly this invention refers to a new and useful composition of matter comprising polymerized trifluorochloroethylene and one or more alkali earth metals, which composition may be caused to gradually react and give off illumination as reaction proceeds. Pyrotechnic compositions are combustible physical mixtures having characteristics intermediate those of a mixture like thermite, which reacts to produce heat, and explosives or explosive compounds. Pyrotechnic mixtures contain oxygen for supporting their own combustion, burn progressively and are usually pressed into candles so that the candle decreases in length as the mixture burns. The burning is a surface phenomenon giving off considerable light.

Pyrotechnics are widely used for fireworks, signaling devices, markers and illuminants. They may be adapted for ground or aircraft use and may be in the form of flares, signals, cartridges, bombs, shells, grenades, etc.

The mnaufacture of such pyrotechnics is a laborious procedure of mixing, blending and fabricating of (a) fuels—usually magnesium or aluminum powder, (b) oxidizers—salts such as chlorates, perchlorotes, chromates, oxalates and nitrates, (c) color intensifier—salts of barium, copper, strontium, sodium or organic dyes, and (d) miscellaneous agents—retarding, binding and waterproofing agents such as asphalt, sulfur, and paraffin; blending and waterproofing agents such as castor oil and linseed oil. Even though a particular mixture is used, uniform candlepower and burning rate are not assured unless all the other factors are closley controlled. Differences in the size and shape of the individual particles making up each ingredient affect the chemical reactions and resulting pyrotechnic values. The loading pressure must be accurately controlled as the candlepower and burning rate are altered by variations in this pressure. The effects of such variations differ with different compositions. From the foregoing it may be seen that the preparation of these compositions is a complex, laborious and, at times, dangerous process. The resulting products vary in their physical properties and when subjected to weather for a period of time become unreliable and their usefulness is reduced or destroyed.

The composition which is the subject matter of this invention is a simple mixture of chemically inert ingredients which may be caused to react with one another to produce illumination. The method of manufacturing the composition is easily and safely performed with a minimum of factors which must be closely controlled. The composition is easily and safely molded into any desired shape or form and its reliability is not affected by weathering.

It is therefore an object of this invention to provide a new and improved composition of matter, the ingredients of which may be caused to react with one another to give illumination.

Another object of this invention is to provide a composition of matter, the ingredients of which are easily and safely prepared and in which the ingredients may be caused to react with one another at a desired rate to give off a desired degree of illumination.

A further object is to provide an easy safe method of manufacturing illuminants and the like.

A final object is to provide an easy and safe method of manufacturing articles which are composed of materials which are ordinarily chemically inert but which materials may be caused to react with one another to destroy the article at a desired rate.

Other objects and features of the invention will become apparent to those skilled in the art as the disclosure is made in the following detailed description.

The composition of matter which is the subject of this invention is a mixture of polymerized trifluorochloroethylene and at least one material selected from a group consisting of magnesium, aluminum or magnesium calcide. Other materials such as other alkali earth metals may be utilized. However, the above listed materials have been found to give the best results. When these materials, in finely divided form, are uniformly mixed in the proper proportions and subjected to heat and pressure the trifluorochloroethylene is caused to flow and to come into intimate contact with the other material or materials. Upon subsequent cooling, the mixture hardens into the shape of any container into which it is forced under pressure when in the heated plastic condition. The cooled mixture is chemically inert under ordinary conditions but, when a portion of the material is subjected to sufficient heat to cause the ingredients to react, the material decomposes. This decomposition is a surface reaction which gives off light and heat. The heat of the reaction causes the reaction to continue more or less rapidly depending on the ingredients selected and the proportions of each in the mixture.

Magnesium, aluminum and magnesium calcide have been found to give excellent results when mixed with the polymerized trifluorochloroethylene. Magnesium has been found to give the highest candlepower ratings. Aluminum has been found to react less strongly than magnesium. Calcium in the form of magnesium calcide also has been found to give excellent results. These materials, all alkali earth metals and hereinafter called the metals, appear to react with the chlorine in the trifluorochloroethylene to form chlorides leaving unstable trifluoroethylene which decomposes into fluorides. This reaction is initiated by subjecting a portion of the material to high temperature by some one of many well known means such as an electric primer or black powder. Once initiated, the heat of reaction causes the reaction to continue until all is decomposed. The metals and the trifluorochloroethylene should be in a finely divided form to allow a more uniform mixture and to allow the particles of the reacting ingredients to come into more intimate contact.

The candlepower rating of the mixture which is the subject of this invention increases as the proportion of the metal in the mixture increases. Where the mixture is to be used as a flare composition it has been found that the mixture should contain 60% to 75% by weight of the metal and 40% to 25% by weight of the trifluorochloroethylene. These proportions produce a mixture having a relatively slow reaction rate and low sensitivity to impact but having a high candlepower rating.

In order that the metal powder and the trifluorochloroethylene may be brought into sufficiently close relationship so that the reaction will take place when heated to a high temperature, the intimate mixture of the powders should be heated to 400° F.±20°. At this temperature the trifluorochloroethylene softens and may be caused to flow into contact with the metal upon the application of pressure. Temperatures above this range approach the temperature at which the trifluorochloroethylene tends to decompose and may create a dangerous condition. When heated to a temperature of 400° F.±20° the application of a pressure of about 5000 p.s.i. will cause the trifluorochloroethylene to flow into contact with the metal powder.

According to the method of this invention the mixture of metal and trifluorochloroethylene the mixture powder is placed in a mold of the desired shape. The mold is then heated to 400° F.±20° and a pressure of substantially 5000 p.s.i. is applied to the mixture by any one of several known means such as a hydraulic ram.

For example, mixtures of magnesium and Kel-F (a trifluorochloroethylene product of the M. W. Kellog Co.) were prepared and molded into pellets of 3.0 grams approximately ½ inch in diameter under a pressure of 5000 p.s.i. at a molding temperature of 390°–400° F. The pellets were ignited and burned for approximately 10 sec. and at 10.5 ft. The following measurements were made:

| Percent Mg | Percent Kel-F | Candle-power |
|---|---|---|
| 40 | 60 | 18 |
| 50 | 50 | 19 |
| 60 | 40 | 25 |
| 70 | 30 | 40 |

The composition and method of this invention are useful in the manufacture of articles which are ignited to produce light such as flare candles for use as signalling devices and for illuminants of both the aircraft and ground types.

The composition and method of this invention are also useful in the manufacture of disposable rocket fuel containers. As the rocket fuel is burned, the heat ignites the mixture of metal and trifluorochloroethylene which makes up the container so that when the rocket fuel is expended no container remains to be dropped from the aircraft, guided missile or rocket on which it is used with the attendant threat of damage and injury.

From the foregoing detailed description it may be seen that using the composition and method of this invention, chemically inert articles may be safely and easily produced. These articles are not subject to weathering and may be easily ignited so that the ingredients react with one another to produce illumination or to destroy the article.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A composition of matter comprising 25 to 40 percent by weight of polymerized trifluorochloroethylene and 60 to 75 percent by weight of at least one material selected from a group consisting of magnesium, aluminum and magnesium calcide.

2. A composition of matter comprising 25 to 40 percent by weight of polymerized trifluorochloroethylene and 60 to 75 percent by weight of aluminum.

3. A composition of matter comprising 25 to 40 percent by weight of polymerized trifluorochloroethylene and 60 to 75 percent by weight of magnesium calcide.

4. An illuminant comprising 25% to 40% by weight of trifluorochloroethylene and 60% to 75% by weight of magnesium.

5. A method of manufacturing a composition of matter for use as an illuminant or the like comprising, selecting at least one material from a group consisting of magnesium calcide, magnesium, and aluminum, reducing said selected material to a powder, mixing 60% to 75% by weight of said powder with 25% to 40% by weight of powdered polymerized trifluorochloroethylene, heating said mixture to about 400° F.±20° and subjecting the heated mixture to a pressure of substantially 5000 p.s.i.

No references cited.